Oct. 23, 1951     H. KONET     2,572,733
GYRO ERECTING MEANS
Filed June 15, 1945
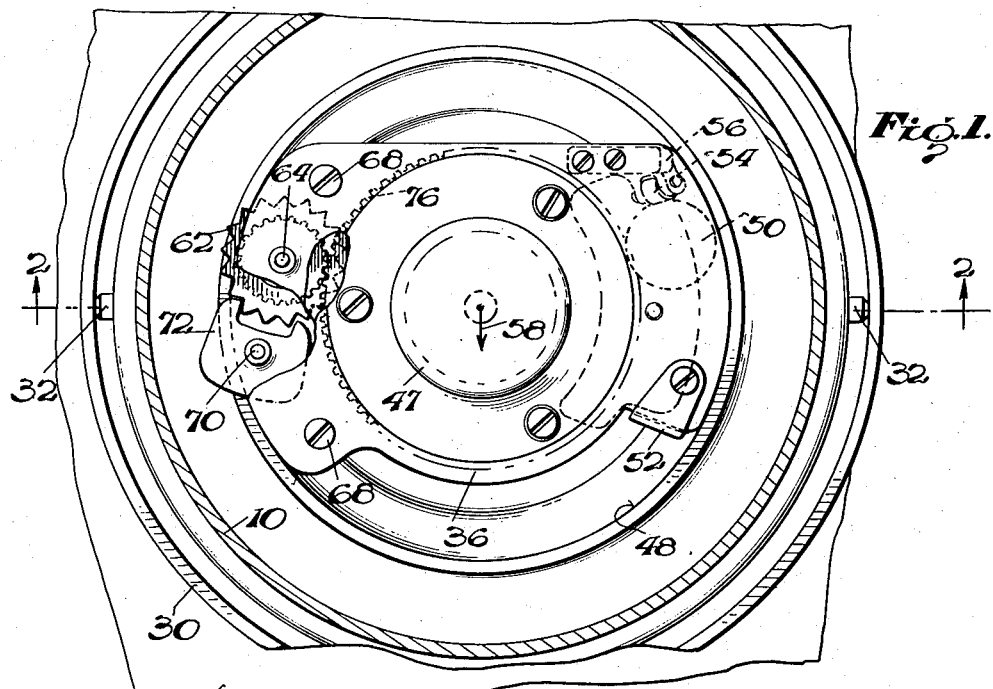
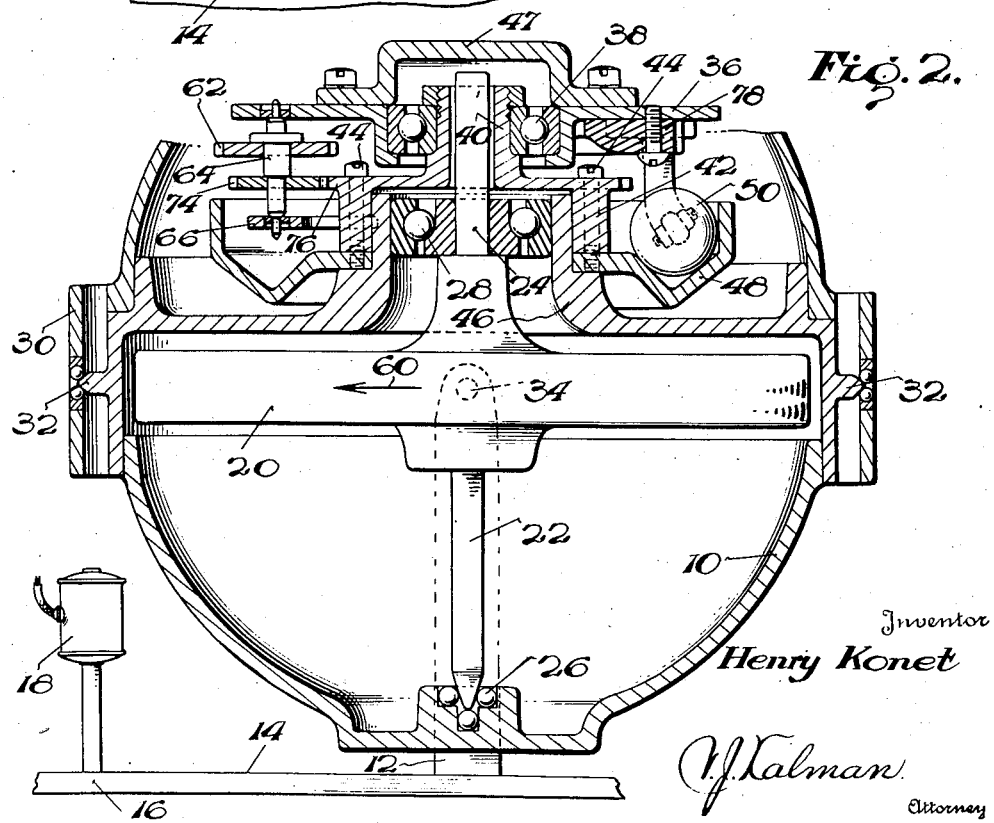
Inventor
Henry Konet
*V. J. Kalman*
Attorney Patented Oct. 23, 1951

2,572,733

UNITED STATES PATENT OFFICE 2,572,733

GYRO ERECTING MEANS

Henry Konet, Paramus, N. J., assignor to Bendix Aviation Corporation, Teterboro, N. J., a corporation of Delaware Application June 15, 1945, Serial No. 599,535

14 Claims. (Cl. 74—5.44)

1

This invention relates to gyroscopic devices of the general type adapted to give an indication of the true vertical in order to provide an artificial horizon on a moving vehicle, such as an aircraft, for example, and the invention relates more particularly to a self-erecting arrangement for such devices for maintaining the gyro spin axis vertical during operation thereof.

It has heretofore been proposed to employ self-erecting systems for gyro verticals, and in the United States Patents to Robert Alkan No. 2,159,118 granted May 23, 1939, and Hugh G. Hamilton, No. 2,300,548 granted November 3, 1942, systems of this type are shown wherein a slip-drive connection between the erecting mechanism and the gyro rotor is utilized for driving the erecting mechanism at a speed substantially less than the speed of the rapidly spinning rotor. In these systems, a regulating or escapement apparatus is also employed in order to maintain the speed of the erecting mechanism substantially constant. Since such regulating aparatus utilized a friction driving device it was found that the control features of the erecting mechanism were not as accurate as desired, due to vibrations and slippage between the cooperating parts of the friction drive.

These disadvantages were overcome by the invention disclosed and claimed in the application of Henry Konet, Serial No. 519,025, filed January 20, 1944, now abandoned, for Gyro Erecting Mechanism, which utilized an eddy current coupling for driving the self-erecting mechanism from the rapidly spinning gyro rotor, and employed also a positive drive for the regulating or escapement apparatus.

The present invention constitutes an improvement of the invention disclosed and claimed in the aforesaid application and provides a novel gyro vertical or artificial horizon having a novel erecting means for accurately maintaining the gyro spin axis in its normally vertical position during operation thereof.

Another object of the invention is to provide a novel gyro vertical wherein rotational velocity is imparted to the erecting mechanism by rotation of the entire gyroscope, thus dispensing with the necessity of interposing a driving connection between the erecting mechanism and the gyro rotor.

A further object is to provide a new and improved gyro vertical wherein the rate of erection may be readily controlled, thereby securing a desired variation in the characteristics of the device in order to more efficiently adapt the

2 operation thereof to various types of installations.

Still another object resides in providing a novel drive for the self-erecting mechanism of a gyro vertical of the foregoing type which results in a material simplification of the structure as well as an improved accuracy in operation.

A still further object comprehends a novel driving arrangement for the erecting mechanism of a gyro vertical, wherein any unbalanced forces which might otherwise cause undesirable precession of the gyroscope and consequent erroneous indicating or control actions are compensated or averaged out.

Still another object resides in the provision of a novel gyro vertical having relatively few parts which are so arranged and function as to secure a marked increase in the accuracy of operation, thereby materially improving the value of the gyro as a navigational instrument.

The above and other objects and advantages of the invention will appear more fully hereinafter from a consideration of the following detailed description when taken in connection with the accompanying drawing wherein one embodiment of the invention is illustrated. It is to be expressly understood, however, that the drawing is utilized for purposes of illustration only and is not to be taken as a definition of the limits of the invention, reference being had for this purpose to the appended claims.

In the drawings wherein similar reference characters refer to similar parts throughout the several views:

Figure 1 is a top plan view, partly in section, of a gyro vertical constructed in accordance with the principles of the present invention, and Figure 2 is a vertical sectional view taken substantially along line 2—2 of Figure 1.

The improved gyro vertical of the present invention is illustrated in the drawings as comprising a casing 10 which may be supported upon a pair of brackets 12, 12 carried by a platform 14, the latter being rotatable about an axis 16 as by means of an electric motor 18. The rotatable platform 14, may if desired, be a radar scanning table, which is supported by the craft and which is rotated by the motor 18 at a relatively slow rate, as, for example, about twenty-four revolutions per minute, in order that the radar scanner or antenna (not shown) may scan the horizon. Also if desired, suitable take-offs and servo apparatus may be utilized in order that the gyro vertical constituting the present invention may be employed for maintaining the platform 14 horizontal, notwithstanding various maneuvers of the craft. While the invention may be advantageously employed in connection with a radar scanning platform, it will be understood that the same is not limited to such use, as the platform 14 may be used for other purposes. Moreover the platform need not be of the stable type, the invention being equally adapted for use in any installation where the entire gyro vertical is rotated at a suitable rate to provide the necessary forces to operate the erecting mechanism.

More particularly, the casing 10 contains a rotor 20 mounted for rotation about a normally vertical axis as by means of aligned shafts 22 and 24 which are adapted to cooperate with bearings 26 and 28 respectively. The casing 10 is moreover mounted within a gimbal suspension including a gimbal ring 30 in which the casing is pivoted for angular movement about a horizontal axis formed by trunnions 32, 32, the gimbal ring, in turn, being pivoted for angular movement about a second horizontal axis perpendicular to the first axis, formed by trunnions 34, 34 which are journalled in the brackets 12, 12.

The erecting mechanism of the present invention includes a carriage 36, and one of the important features of the invention lies in the fact that the carriage has no driving connection whatsoever with the rapidly spinning rotor 20. More particularly, the carriage 36 is rotatably supported by bearings 38, the latter being carried by a reduced upper portion 40 of a hollow sleeve 42 which is fixedly secured as by screws 44 to a hub portion 46 of the casing 10. The latter also constitutes a support for the bearing 28 as will be clear from Figure 2. If desired a suitable cap 47 may be provided for covering the bearing 38 and upper end of shaft 24.

Also constituting a part of the erecting mechanism is a circular track member 48 which is clamped between the hub portion 46 and the hollow sleeve 42 and which defines a path of travel for a weighted mass in the form of a ball 50 which is limited in its rolling motion along the track between a downwardly extending limit plate 52 carried by the carriage 36 and a roller 54 supported by a bracket 56 which is likewise carried by the carriage.

With the rotor spin axis in a normally vertical position, rotation of the platform 14, in a clockwise direction, will cause rotation of casing 10 about the axis 16. The casing 10 will thus be rotated about its own axis (22, 24) in a clockwise direction. For each revolution of the platform 14 about the vertical axis 16, the casing will be rotated 360 degrees about its axis.

The ball 50 and the carriage 36 will occupy a relatively stationary position with respect to the casing 10, assuming the gyroscope spin axis to be in its vertical position. Rotation of platform 14 will rotate the erection mechanism in a clockwise direction about the gyroscope spin axis. The rotational speed of the erecting mechanism will be approximately equal to the rotational speed of the platform, or about 24 R. P. M.

Assuming that the spin axis of the gyroscope is tilted for any reason, the track member 48 will also be tilted. The ball 50 of the erecting mechanism will roll downhill due to gravity, to seek the lowermost position of the track. Since the tilt of an operating gyroscope will remain in the same plane in the absence of any correcting forces, a freely mounted carriage 36, weighted with the ball 50 engaging plate 52 or roller 54, would remain stationary, while the casing 10 continued to rotate in the aforesaid manner. No erecting torques would be provided under these conditions.

In order to regulate the aforesaid relative movement of the carriage 36 with respect to casing 10, and to provide the necessary erecting torque about the spin axis of the gyroscope, the present invention provides a regulating or escapement mechanism. As shown, such mechanism includes a star wheel 62, secured to a shaft 64, the latter being rotatably supported at its upper and lower ends respectively, by the carriage 36 and by a plate 66 secured to the carriage by means of suitable spacers 68. A second shaft 70, likewise rotatably supported by the carriage 36 and plate 66 supports a forked anchor 72 thereon which engages the star wheel 62, see Figure 1.

In order to rotate the star wheel 62 during relative rotation between the carriage 36 and the casing, a pinion 74, secured to the shaft 64 meshes with a stationary gear 76 which may be carried by or formed integrally with the sleeve 42. Thus any relative rotation of the carriage and casing, causes the pinion 74 to be driven about gear 76 to rotate the star wheel 62, the speed of movement of the latter in turn, being governed by anchor 72 whereby motion is imparted to the carriage.

Assuming that an acceleration force acts in the direction of the arrow 58 in the plane of the paper and causes a departure of the gyroscope spin axis from its vertical position, track member 48 will be inclined equally from the horizontal. Prior to the action of the acceleration force and departure of the rotor spin axis from the vertical, the carriage 36 is rotated in a clockwise direction in the manner described, and rolls the ball 50 along the track at a rate approximately that of the platform 14. With the track 48 tilted, the ball 50 will roll down the incline and engage plate 52 of the carriage and speed up the carriage within the limits set by the escapement mechanism.

The ball 50 will seek the lowermost position of the track 48 and remain there until roller 54 carries the ball up the inclined track. Engagement of the ball and roller will momentarily stop the carriage, thereby creating a torque about the trunnions 34, 34 to cause precession of the gyroscope about the trunnions 32, 32 back to its normal vertical position. The carriage will then continue to rotate and roll the ball at normal speed until such time as forces again act upon the gyroscope causing a departure of the spin axis from its vertical position.

Since any rotation of the carriage 36 and the ball 50 is entirely independent of variations in gyro rotor speed, it will be clear that the only forces acting to effect relative rotation between the carriage and casing are those caused by accelerations acting on ball 50 and plate 52 and those due to the deviation of the spin axis from the true vertical. Hence, even a small acceleration is sufficient to make the time during which the ball travels around one-half of the circumference to materially differ from the time required for it to travel around the other half of the circumference. Such variation manifests itself by a tendency of the gyro to erect its spin axis in the direction of the acceleration and by a direct precessional movement and not by a spiral precessional movement.

It is believed that the operation of the new and improved gyro vertical will be clear from the foregoing description. While the invention has been described in connection with the operation of the erecting mechanism as to the effect of acceleration forces acting to disturb the rotor spin axis, it will be understood that the self-erecting mechanism also functions to correct for tilting of the rotor spin axis due to bearing friction or causes other than acceleration forces, it being obvious that in such cases, a gravitational pull is exerted on the ball 50 to speed up its movement over one-half the circumference of track 48, depending upon the direction of tilt, and to slow up the ball during its upward movement. At the time that upward motion begins, momentary stopping of carriage 36 and ball 50, due to gravitational pull which is in the opposite direction at this point, results to create moments about either trunnions 32 or 34, again depending upon the direction of tilt, to cause the rotor to precess into its normally vertical position.

There has thus been provided by the present invention a novel gyro vertical which includes a material simplification and improved accuracy over devices of this type heretofore utilized. By reason of the complete elimination of all driving connections between the gyro rotor and the self-erecting mechanism and relying wholly upon the rotation of the entire gyro vertical for the development of the automatically operating forces to effect self-erection of the unit, a greatly improved operation is secured, with the elimination of parts heretofore considered essential. Thus the invention is particularly adaptable for use on aircraft as an indicating or controlling device where accuracy of operation and a saving in weight are important factors.

While one embodiment of the invention has been illustrated and described herein, various changes and modifications in the form and relative arrangement of the parts, which will now appear to those skilled in the art, may be resorted to without departing from the scope of the invention. For example, a suitable counterweight 78 may be provided on the carriage 36, if found to be necessary to balance the parts 52, 50 on the one side and the escapement mechanism on the other. Also, any type of rotatable member may be provided for rotating the gyro vertical in its entirety, instead of a radar scanning platform which has been referred to hereinbefore by way of example only. Various other changes may be made within the scope of the invention as defined in the appended claims.

What is claimed is:

1. The combination with a gyro vertical having a rapidly spinning vertically arranged rotor, of an erecting mechanism for maintaining the rotor spin axis in a normally vertical position, a gimbal suspension for mounting the gyro for angular movement about a pair of mutually perpendicular horizontal axes, and means to rotate said suspension about an axis other than the spin axis of the rotor mechanism at a substantially constant and relatively slow rate as compared to the speed of rotation of the rotor, the last-named means causing relative rotation between the erecting mechanism and gyro for the development of erecting forces when the spin axis of the rotor departs from a vertical position.

2. The combination as defined in claim 1 which includes in addition, an escapement mechanism for regulating the speed of rotation of said carriage during movement thereof at said variable rate.

3. In a gyro vertical having a vertically arranged rapidly spinning rotor, a gimbal suspension for mounting said rotor for angular movement about a pair of mutually perpendicular horizontal axes, erecting mechanism for returning the gyro to a vertical position when the rotor axis is inclined to the vertical, and means for effecting operation of said erecting mechanism comprising a member for rotating said suspension about an axis other than the spin axis of the rotor.

4. A gyro vertical comprising a casing having a vertically arranged rapidly spinning rotor therein, means for mounting said rotor for angular movement about a pair of mutually perpendicular horizontal axes, a self-erecting mechanism within the casing, and means for rotating said casing about an axis other than the spin axis of the rotor for causing relative rotation between the erecting mechanism and casing for creation of erecting forces when the rotor axis departs from the vertical position.

5. The combination as set forth in claim 4 which comprises in addition, an escapement mechanism for regulating the relative rotation between the erecting mechanism and casing.

6. The combination with a gyro vertical having a vertically arranged rapidly spinning rotor, of an erecting mechanism for maintaining the rotor spin axis in a normally vertical position and comprising a member mounted for independent rotation with respect to said rotor, and means for causing rotation of said member to secure erecting forces when the rotor axis departs from the vertical including a support, means for mounting the gyro on the support, and means to rotate the support about an axis other than the spin axis of the rotor at a normally constant speed substantially less than the speed of rotor rotation.

7. A gyro vertical comprising a casing having a rotor mounted therein for spinning about a normally vertical axis, means for mounting said casing for angular movement about two mutually perpendicular axes at right angles to the spin axis, an erecting mechanism for said rotor, and a support for said mounting means rotatable about an axis other than the rotor spin axis to operate said erection means upon rotation thereof to create the erecting forces for said rotor upon departure thereof from its vertical axis.

8. A gyro vertical comprising a casing having a rotor mounted therein for spinning about a normally vertical axis, means for mounting said casing for angular movement about two mutually perpendicular axes at right angles to the spin axis, a carriage rotatable about the spin axis of the rotor, a mass freely movable about the rotor spin axis limitedly restrained by said carriage, an escapement mechanism for said carriage to limit the rotational speed thereof, and a support for rotating said mounting means to rotate said carriage and said mass about the spin axis of the rotor for providing an erecting torque for said rotor upon departure of the spin axis thereof from its vertical axis.

9. In a gyroscope, a support, a rotor mounted in said support for spinning about an axis having a predetermined attitude, means for mounting said support for angular movement about two mutually perpendicular axes at right angles to the spin axis, and a self-erecting mechanism for said rotor including a mass rotating about the spin axis solely in response to rotation of said mounting means and thereby exerting a torque, when the spin axis departs from said predetermined attitude, to erect said spin axis to said predetermined attitude.

10. In a gyroscope, a support, a rotor mounted in said support for spinning about an axis having a predetermined attitude, means for mounting said support for angular movement about two mutually perpendicular axes at right angles to the spin axis, a self-erecting mechanism including a mass and mounted for rotation about the spin axis at a substantially constant rate in response to rotation of said mounting means when the spin axis is in said predetermined attitude, and means to rotate said mechanism at a variable rate in response to rotation of said mounting means when the spin axis departs from said predetermined attitude and thereby produce forces to erect said spin axis to said predetermined attitude.

11. The combination, with a gyroscope having a rotor and an erecting mechanism for maintaining the rotor spin axis in a predetermined attitude, including a carriage mounted for rotation solely in response to rotation of said gyroscope, said carriage rotating at a substantially constant and relatively slow rate when said spin axis assumes said predetermined attitude, and said carriage rotating at a variable rate upon departure of the spin axis from said predetermined attitude to produce erecting forces to return the spin axis to said predetermined attitude.

12. The combination with a gyroscope having a rotor, and a means supporting said rotor for spinning about an axis having a predetermined attitude, of an erecting mechanism for maintaining the rotor spin axis in said predetermined attitude and including a carriage rotatable relative to said means upon departure of said spin axis from said predetermined attitude and solely in response to rotation of the gyroscope.

13. In a gyroscope having a rotor spinning about an axis having a predetermined attitude, a gimbal suspension mounting said rotor for rotation about a pair of mutually perpendicular axes at right angles to said spin axis, an erecting mechanism for returning the spin axis to said predetermined attitude when said axis departs therefrom, and means for effecting operation of said erecting mechanism including a member for rotating said suspension about an axis other than the spin axis of the rotor.

14. The combination with a gyroscope having a rotor and means supporting said rotor for spinning about an axis having a predetermined attitude, of an erecting mechanism for maintaining the rotor spin axis in said predetermined attitude and including a carriage rotatable relative to said means independently of the rotor, in response to rotation of the gyroscope, upon departure of said spin axis from said predetermined attitude.

HENRY KONET.

REFERENCES CITED

The following references are of record in the file of this patent:

UNITED STATES PATENTS

| Number | Name | Date |
|---|---|---|
| 1,308,783 | Gray et al. | July 8, 1919 |
| 1,311,768 | Gray et al. | July 29, 1919 |
| 1,313,532 | Gray et al. | Aug. 19, 1919 |
| 2,198,551 | Mellier | Apr. 23, 1940 |
| 2,370,904 | Kimball | Mar. 6, 1945 |
| 2,408,411 | Curry, Jr. | Oct. 1, 1946 |
| 2,435,581 | Greenland | Feb. 10, 1948 |
| 2,438,213 | Hamilton | Mar. 23, 1948 |

FOREIGN PATENTS

| Number | Country | Date |
|---|---|---|
| 132,944 | Great Britain | Oct. 2, 1919 |
| 173,839 | Great Britain | Jan. 3, 1922 |